Dec. 27, 1938.    C. E. GRAY    2,141,977
APPARATUS FOR DETERMINING THE GASEOUS CONTENT OF MATERIALS
Filed Dec. 21, 1936
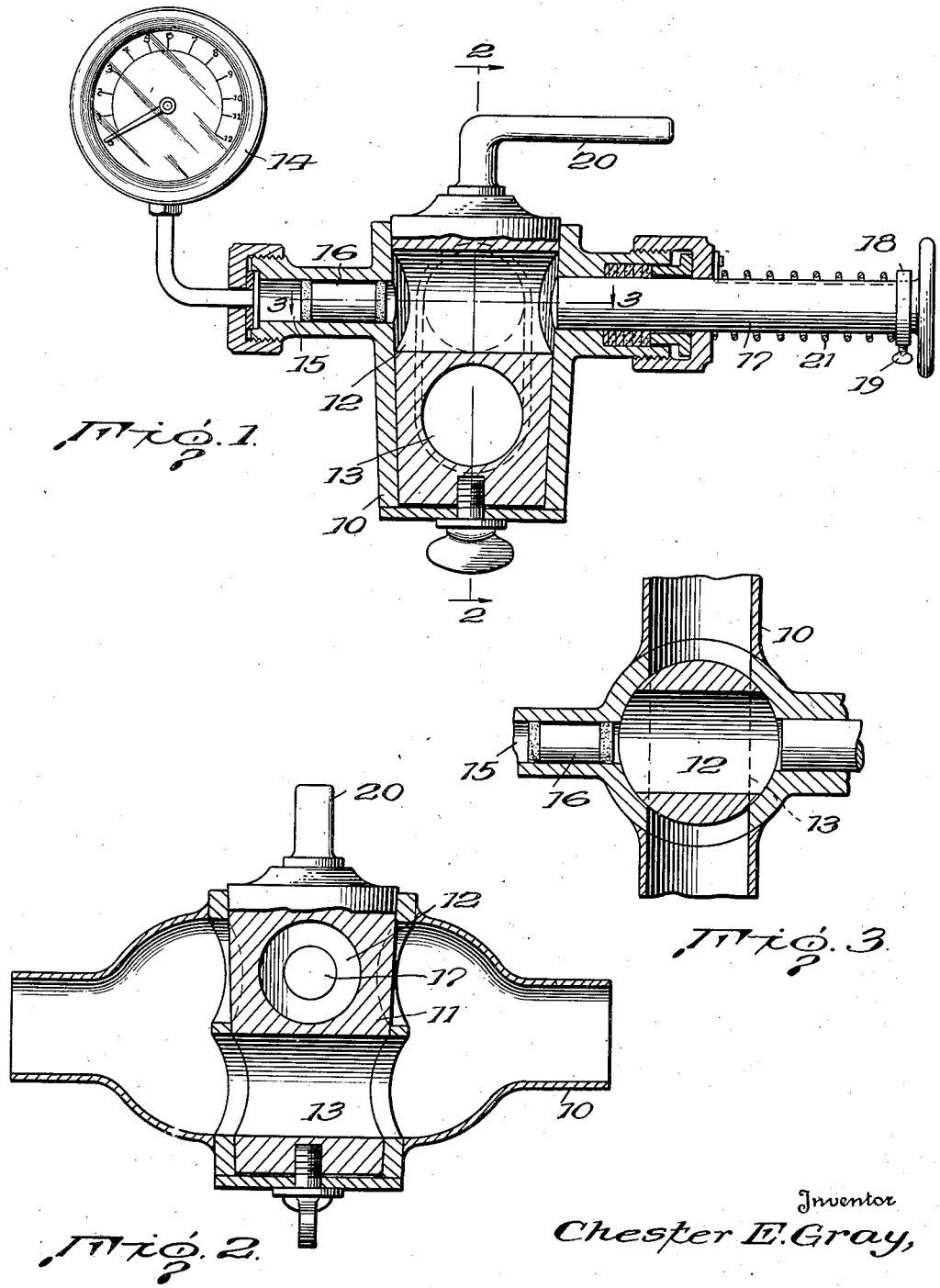
Inventor
Chester E. Gray,
By Church & Church
His Attorneys Patented Dec. 27, 1938

2,141,977

UNITED STATES PATENT OFFICE 2,141,977

APPARATUS FOR DETERMINING THE GASEOUS CONTENT OF MATERIALS

Chester Earl Gray, Oakland, Calif.

Application December 21, 1936, Serial No. 117,054

3 Claims. (Cl. 73—151)

This invention relates to improvements in apparatus for determining and regulating the gaseous content of materials containing gaseous constituents.

The principal object of the invention is to provide an apparatus by which the gaseous content of a mixture containing air or the like can be readily ascertained.

A still further object is to provide an apparatus with which small increments or samples of the mixture can readily be withdrawn or removed from a constantly moving stream or body of the mix and the gaseous content of said sample quickly determined, so that the supply of gas incorporated in the mix can be instantaneously varied, if necessary, to maintain a uniform gaseous content in the mix.

More specifically, the invention is especially adapted for use in connection with ice cream freezers, samples of the ice cream mix being withdrawn or removed from the main body of mix and the air content thereof quickly determined, so that the air incorporated in the mix may be varied, or regulated, as desired.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a sectional view illustrating the present invention or apparatus applied to an ice cream freezer, the view being taken transversely of the conduit for the ice cream mix;

Fig. 2 is a sectional view taken longitudinally of the conduit, as indicated by the line 2—2 of Fig. 1; and Fig. 3 is a horizontal sectional view on the line 3—3 of Fig. 1.

Heretofore, in the ice cream manufacturing industry, it has been the practice to check the air content of the ice cream mix as it is discharged from the freezer by weighing each individual container or can before the latter is placed in the hardening room. This, however, is not entirely satisfactory, because the can must be filled before a check can be made and, before the deficiency or excess of air, if such be the case, can be corrected, many gallons of mix will have been discharged from the freezer or, in the case of separate freezing and whipping or aerating chambers, from the latter. Also, where the mix is discharged and packed in small cartons, it is quite impractical to check on the air content. Another procedure for determining the air content is to weigh small samples on a specially calibrated balance in containers of known weight and capacity. However, this procedure offers certain disadvantages not encountered with the present apparatus. With the present invention, however, the air content can be periodically determined by testing small increments or samples of the mix before discharge from the freezer apparatus. For instance, in the present illustration, the tubular member 10 may represent the discharge line of an ice cream freezing apparatus and positioned within said member is a rotatable body 11 having a recess or opening 12 therein, in which an increment or sample of ice cream mix can be trapped, so to speak, by first turning member 11 to position opening 12 longitudinally of tube 10, and then giving said member another quarter turn to position said opening transversely of the tube, as shown in the drawing. If desired, a second opening 13 may be provided in member 11 at right angles to opening 12, so that the movement of mix through the tube will be substantially uninterrupted.

After a sample of mix has thus been trapped or withdrawn from the main body of mix, it is placed under changed pressure, preferably by compression, and, by determining the variation in its density under a given pressure, its gaseous content is instantly ascertained and, if there is a deficiency or excess of air, the supply of air in relation to the supply of mix under treatment can be altered, or the temperature of the mixture may be altered, to establish the proper ratio of gas in the mix. The variation in density, or compressibility, of the mix actuates means responsive to such variations and, as the regulation of the air supply is to be carried out in conjunction with said means, it will be appreciated that such air regulation may be either manual or by means actuated automatically from said density-responsive means. For simplicity, however, the present apparatus is shown as consisting of a pressure gauge 14 connected to a chamber 15 having a slidable closure 16 therein exposed to the interior of recess 12 when the latter is turned to its closed position. Thus, when a sample of mix is trapped in recess 12 and pressure imposed thereon, the pressure transmitted to closure 16 will be dependent upon the compressibility (or air content) of the sample of mix. In other words, if the mix has an excessive amount of air or gas therein, it will possess a greater degree of compressibility and will be reduced in volume to a greater extent than if there was a deficiency of air or gas. In the former instance, the greater reduction in volume will result in less pressure on closure 16 and in the latter case a greater pressure will be exerted on the closure. The movement of closure 16 will, therefore, depend upon the variation in the volume of the mix in chamber 12 and will also determine the reading registered on gauge 14 and, in turn, the regulation of the air supply, whether manual or automatic, will depend upon the pressure registered on said gauge.

Various means may be utilized for changing the pressure on the sample of mix trapped in opening 12, it only being essential that a uniform procedure be used on successive samples. In the present apparatus, there is a plunger 17, slidable into and out of opening 12. By moving the plunger into the opening a predetermined distance, a uniform displacement will result, but the pressure imposed on the mix will be in proportion to the gaseous content of the mix. Where the plunger is actuated manually, as in the present instance, the throw or inward movement thereof can be controlled by a stop 18, preferably in the form of an adjustable collar adapted to be held in position on the plunger by a set screw 19. Said collar engages the exterior of the conduit and thus limits the inward movement of the plunger. Of course, where the plunger is advanced mechanically, suitable means can readily be provided for limiting the throw thereof. A spring 21 can be provided for retracting the plunger.

The operation of the device, described briefly in conjunction with the control of the air content of ice cream, is as follows. Assuming the parts to be in the positions illustrated in the drawing and that a body of frozen mix is moving through passage 13 in member 11, the operator will turn said member a quarter turn by means of handle 20. The mix will then enter opening 12 and, when said member is restored to its original position, a sample of the mix will be trapped therein. Plunger 17 is then advanced, either manually or mechanically, to impose a given displacement on the trapped mix. The air content is the only compressible ingredient of the mix, and the compressibility of a mix having a known air content under the given displacement having been previously determined, the reading registered on gauge 14 will accurately denote the air content of the mix being treated. If the air content is either below or above the percentage desired, the air supply to the mix can be actuated in accordance with or in conjunction with the gauge to increase or decrease the air supply as may be necessary.

To those skilled in the art of controlling air or gaseous content of mixtures, and especially ice cream and the like, it will immediately be obvious that the pressure gauge through its movable indicator may be arranged to operate an electrical mechanism whereby valves are operated to regulate the air supply being delivered to the mixing apparatus, or the flow of the mixture to be aerated, or the amount of refrigerant being used, any or all of which may be utilized to regulate the amount of air or gas incorporated.

While the procedure thus far set forth has referred more specifically to placing the material under increased pressure, it is obvious that similar results may be secured by reducing the pressure.

What I claim is:

1. In a device for determining the gaseous content of a mixture, containing an incompressible ingredient the combination of a conduit through which the mixture is adapted to move, means located in said conduit for withdrawing successive increments of said mixture from the body of mixture moving through said conduit and confining the same, said withdrawing and confining means comprising a chambered member movable into receiving and confining positions, means movable into the chamber of said member when the latter is in its confining position for compressing each individual increment, and means responsive to variations in the density of each increment under compression.

2. In a device for determining the gaseous content of a mixture, containing an incompressible ingredient the combination of a conduit for the mixture, a rotary member in said conduit, said member having two ports extending therethrough at an angle to each other, means for sealing one of said ports to confine a body of mixture therein, the other of said ports being open to permit continued movement of mixture through the conduit, means for compressing the body of mixture confined within the sealed port, and means responsive to variations in the density of the confined mass.

3. In a device for determining the gaseous content of a mixture containing an incompressible ingredient, the combination of a conduit for said mixture, a ported member in said conduit movable from a position with the port therein disposed longitudinally of said conduit to a position to seal off said port at its ends whereby material will be trapped in said port, means for compressing the body of mixture confined within the sealed port, and means responsive to variations in the density of the confined mass.

CHESTER EARL GRAY.